US007000604B2

(12) United States Patent
Berger et al.

(10) Patent No.: US 7,000,604 B2
(45) Date of Patent: Feb. 21, 2006

(54) CUTTING TOOL

(75) Inventors: Guenther Berger, deceased, late of Notzingen (DE); by Marianne Berger, legal representative, Notzingen (DE); by Frank Berger, legal representative, Notzingen (DE); Stephane Chomienne, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/221,383

(22) PCT Filed: Dec. 12, 2001

(86) PCT No.: PCT/DE01/04664

§ 371 (c)(1),
(2), (4) Date: Sep. 11, 2002

(87) PCT Pub. No.: WO02/055276

PCT Pub. Date: Jul. 18, 2002

(65) Prior Publication Data

US 2003/0131838 A1 Jul. 17, 2003

(30) Foreign Application Priority Data

Jan. 15, 2001 (DE) ................................ 101 01 451

(51) Int. Cl.
*B28D 1/04* (2006.01)

(52) U.S. Cl. .................................................. 125/13.01

(58) Field of Classification Search ................ 451/541, 451/557; 125/13; 175/403, 405.1; 408/1 BD, 408/27, 204, 145
See application file for complete search history.

(56) References Cited

U.S. PATENT DOCUMENTS

| | | | | |
|---|---|---|---|---|
| 2,511,991 | A * | 6/1950 | Nussbaum | 175/405.1 |
| 3,888,320 | A * | 6/1975 | Maxwell | 175/394 |
| 4,478,297 | A * | 10/1984 | Radtke | 175/432 |
| 4,757,645 | A | 7/1988 | Ozer | |
| 4,907,663 | A * | 3/1990 | Maier | 175/405.1 |
| 4,911,253 | A | 3/1990 | Cliche | |
| 5,082,403 | A * | 1/1992 | Sutton et al. | 408/68 |
| 5,131,478 | A | 7/1992 | Brett et al. | |
| 5,167,475 | A * | 12/1992 | Miyanaga | 408/204 |
| 5,174,696 | A * | 12/1992 | Bogner | 408/206 |
| 5,462,130 | A | 10/1995 | Peetz | |
| 5,775,445 | A | 7/1998 | Kleine | |
| 5,865,571 | A * | 2/1999 | Tankala et al. | 408/1 R |
| 6,227,188 | B1 * | 5/2001 | Tankala et al. | 125/13.01 |

FOREIGN PATENT DOCUMENTS

CN 1058824 A 9/1992

(Continued)

OTHER PUBLICATIONS

Database WPI Section PQ, Week 198140 Derwent Publications Ltd., London, GB, An 1981-K3558D XP002198990 & SU 795 883 A, Jan. 15, 1981.

(Continued)

*Primary Examiner*—M. Rachuba
(74) *Attorney, Agent, or Firm*—Michael J. Striker

(57) ABSTRACT

A cutting tool, in particular a tile cutting tool, with a base body, which can be clamped into a tool-holding device of a machine tool and driven to rotate, and with a cutting head that is set with cutting particles, and at least the cutting head and the base body are comprised of separate components and that the component, which constitutes the cutting head, is designed to be replaceably fastened to the base body by a detachable connection and the base body has a receptacle for containing coolant.

8 Claims, 2 Drawing Sheets

FOREIGN PATENT DOCUMENTS

| | | | |
|---|---|---|---|
| DE | 38 41 871 A | | 6/1990 |
| DE | 197 30 539 C1 | | 4/1999 |
| DE | 19958536 | * | 6/2001 |
| EP | 0 467 580 A1 | | 1/1992 |
| JP | 2002-120218 | * | 4/2002 |
| RU | 795883 | | 1/1981 |
| SU | 57266 | | 9/1977 |
| SU | 572566 | * | 9/1977 |

OTHER PUBLICATIONS

Patent Abstracts of Japan vol. 001, No. 078 (M-027), Jul. 25, 1977 & JP 52 023780 A, Feb. 22, 1977.

* cited by examiner

CUTTING TOOL

BACKGROUND OF THE INVENTION

The invention is based on a cutting tool.

There are known diamond drill bits and tile cutting tools that have a base body, which can be clamped into a tool-holding device of a machine tool and driven to rotate, and that have a cutting head set with diamonds. The base body and the cutting head are non-detachably connected to each other.

When working with a machine tool, for example when drilling, chiseling, grinding, sawing, milling, etc., friction in the work region generates heat. In order to prevent an overheating and a resulting increased wear and/or damage to a tool as well as damage to an item being machined, it is known to flush a device with water in the work region. When drilling concrete or stone, so-called wet drill bits are used.

SUMMARY OF THE INVENTION

The invention is based on a cutting tool, in particular a tile cutting tool, that has a base body, which can be fastened into a tool-holding device of a machine tool, in particular a hand machine tool, and driven to rotate, and that has a cutting head set with cutting particles.

The invention proposes that at least the cutting head and the base body be comprised of separate components and that the component constituting the cutting head be designed to be replaceably fastened to the base body by means of a detachable connection. The possibility of separating the cutting head from the base body permits the separate replacement of a worn-out and/or defective cutting head, without the base body having to be replaced. The base body can be used repeatedly, resulting in cost savings, particularly with high-cost, high-grade base bodies. It is also possible to use one base body for several different kinds of cutting head. Specific client wishes can be addressed through the selection of the cutting particles, their bonding to the cutting head, their number, and their quality. In this connection, the cutting head can be correspondingly color-coded. Furthermore, a cutting diameter can be rapidly changed by replacing the cutting head.

The detachable connection of a threaded connection is advantageous. The cutting head and the base body can have structurally simple and inexpensive threads formed onto them, which have a large contact area in relation to each other in their overlap region and permit a large heat flux from the cutting head to the base body via the contact area. In order to prevent an unintentional loosening of the threaded connection, the cutting head and the base body can be secured in the axial and/or circumferential direction by means of a form-fitting engagement, for example by means of a form-fit with a separate, pin-like component, etc. Other positively engaging and/or form-fitting connections deemed useful by one skilled in the art can also be provided for attaching the cutting head to the base body, for example clamped connections, detent connections, etc.

An internal thread is advantageously formed onto the cutting head, which can be brought into engagement with a corresponding external thread on the base body. An internal thread on the cutting head can give the cutting head a large external surface area by means of which the heat generated during the cutting process can be advantageously conveyed outward. Furthermore, the base body in particular can be advantageously protected inside the internal thread of the cutting head.

If the cutting head has a core with a favorably conductive metal, e.g. copper, then the heat can be conveyed from the cutting head to the base body in a particularly advantageous fashion. This can achieve a long service life and a reduction in costs.

In a particularly advantageous fashion, the base body is comprised of a receptacle for containing coolant. Base bodies without an integrated cooling system are as a rule less expensive than base bodies with a cooling system, which makes the embodiment according to the invention with the replaceable cutting head particularly suitable for use for the latter high-grade base bodies. The high-grade base bodies with open and closed cooling systems can advantageously be used repeatedly.

In a corresponding base body, heat that is generated during cutting can be transmitted by means of the detachable connection to the coolant contained in the receptacle. An intense heating of the cutting head can be prevented and the service life can be extended.

The invention also proposes that the receptacle adjoin a chamber that is closed in a gas-tight manner in relation to the outside. An advantageous cooling of the tool from the inside the can be achieved and the coolant is prevented from contacting a machining location. The closed chamber permits a system to be produced, which is closed, clean, and particularly suitable for electric hand machine tools and is designed for dissipating heat from the region of the work surface, thus preventing overheating. Pumps and cooling circuits as well as a special protection of electrical components from the coolant, which are often required in open systems, can be eliminated. Despite a favorable heat dissipation from the region of the work surface, inexpensive tools can be produced that can be used in standard machines. The chamber can be closed in a sealed fashion by various structures deemed useful by one skilled in the art, for example by means of a cover and/or one or more relief valves, which open before the tool is destroyed by an overpressure.

If the physical state of the coolant during a working process can be at least partially changed by means of a generated thermal energy, then the physical state change can be used to particular advantage for conveying heat away from the region of the work surface.

Various solid, pasty, or liquid materials deemed useful by one skilled in the art can be used as the coolant. However, it is particularly advantageous if the coolant is comprised of a liquid, which can at least partially evaporate during a working process. In order to achieve an advantageous evaporation process and to prevent an undesirable overpressure, the chamber is preferably only partially filled with the liquid and partially with a gas. The gas portion can be compressed when the water evaporates. The tool behaves like a pressure chamber at high pressures, for example up to 100 bar at 300° C., which the tool must be designed to withstand. The pressures that are produced can easily be determined by means of vapor pressure curves. However, it is also possible to embody a boundary wall of the chamber as elastically deformable.

If the liquid evaporates against a surface in the chamber in the region of a work surface, the vapor rapidly spreads throughout the chamber and advantageously conveys the heat away from the region of the work surface in an effective manner. A higher amount of thermal energy can be absorbed with water evaporation than with water heating and a large heat flux to cool regions can be achieved, in which the water vapor condenses and water is once again available for the cooling. The evaporation process absorbs energy in proportion to the evaporation enthalpy of the coolant.

If at least part of the coolant is always in a liquid state during a working process, then a centrifugal force acting on the liquid can also be used so that at least one surface of the chamber in the region of the work surface is always covered by the liquid. Heat accumulations due to gas bubbles can be reliably prevented. Furthermore, by swirling the water during the operation of the tool, an additional heat dissipation to cool regions and an additional cooling action can be achieved. Alternatively or in addition to recirculating the liquid water back to the work region by means of the operative centrifugal force, it is conceivable for the base body to contain one or more elements that use the capillary effect, which can be used to recirculate the water.

An equilibrium during operation between liquid and vaporous coolant can be influenced by means of various parameters, for example through selection of a liquid with a particular boiling temperature, through the quantity of liquid introduced, through a particular pressure in the chamber when cooled, etc. In order to assure that the coolant evaporates even at low temperatures and in order to be able to use the effect of physical state change at a low temperature, a liquid with a low boiling temperature is advantageously used, for example alcohol. In order to be able to dissipate as much energy as possible during the evaporation process, a liquid with a high evaporation enthalpy is advantageously used, for example water.

One embodiment of the invention includes the proposal that the coolant be comprised of water and that part of the chamber be filled with air. It is therefore possible to manufacture the tool in a particularly inexpensive and simple fashion. Furthermore, filling the chamber with water and air reliably prevents environmental damage, for example due to a defect in the tool.

If the chamber is disposed between at least one inner tube and one outer tube, the tool can be produced in a simple, stable, and inexpensive fashion. Furthermore, particularly with diamond drill bits, a desired clearance can be produced in the radially inner region in a structurally simple fashion. The tubes can be connected by a number of joining methods deemed suitable by one skilled in the art, for example laser welding, soldering, gluing, etc. In a particularly advantageous embodiment, the tubes and/or additional other components are joined to one another in a common process step and possibly at the same time, the cutting particles are attached to the tool, for example by virtue of the contact points being coated with a solder and then the parts being joined in an oven.

In addition, a component that closes the chamber is disposed in a rotationally symmetrical fashion on a shaft end that can be fastened or clamped in the tool-holding device. At the shaft end, the component is protected from external influences during operation and particularly in rotating tools, an imbalance due to the component can be reliably prevented.

The component can be attached by means of various connections, for example a glued connection, a soldered connection, or a welded connection, etc. If the component is fastened by means of a thread, this permits a particularly inexpensive, clean, and simple installation. If the component is a screw, then it can also be advantageously used to stabilize the shaft.

In addition, an inexpensive and reliable closure of the chamber can be achieved by means of a press-fitted ball. With a so-called ball closure, a filling conduit can be embodied with a small cross sectional area and repercussions on stability can be largely prevented, for example in a shaft of the base body. Furthermore an unintentional opening can be prevented.

At least in one region, the base body advantageously has a surface area that is enlarged by means of at least one cooling rib. A large surface area permits a favorable heat dissipation from the chamber toward the outside. In addition, cooling air can flow against the base body, for example motor cooling air of a machine tool.

If the base body has a work region with a small cross sectional surface area or with a small volume, for example a base body of a drill bit or of a tile cutting tool with a small diameter, so that only a small quantity of coolant can be accommodated in the work region, then the chamber is advantageously provided with a larger cross sectional surface area in the axial direction in front of the work region than in the work region itself. It is therefore possible to provide a sufficient chamber volume for the coolant. A type of storage chamber for the coolant is produced. Heat can be advantageously dissipated from the storage chamber toward the outside over a large surface area, particularly at high speeds.

The embodiment according to the invention can be used in various cutting tools deemed suitable by one skilled in the art, in cutting tools with a machining direction that extends in the longitudinal direction and/or lateral to the longitudinal direction of the tool. The embodiment according to the invention is particularly useful, however, in tile cutting tools, which as a rule have a machining direction that extends lateral to the longitudinal direction of the tool. An advantageous cooling of the side surfaces of the cutting head can be achieved despite the presence of a separate cutting head and base body.

Other advantages ensue from the following description of the drawings. The drawings show an exemplary embodiment of the invention. The drawings, the specification, and the claims contain numerous features in combination. One skilled in the art will also suitably consider the features individually and will unite them in other meaningful combinations.

DESCRIPTION OF THE PREFERRED EMBODIMENT

Figure 1:
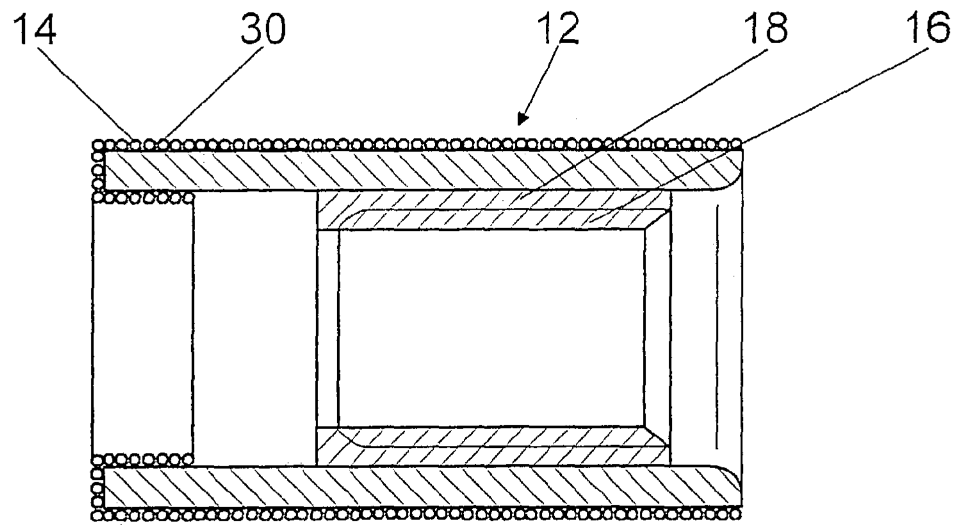
FIG. 1 shows an enlarged depiction of a longitudinal section through a cutting head.
Figure 2:
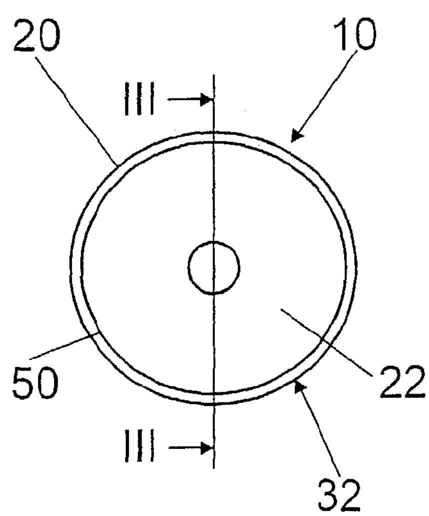
FIG. 2 shows a top view of a base body.
Figure 3:
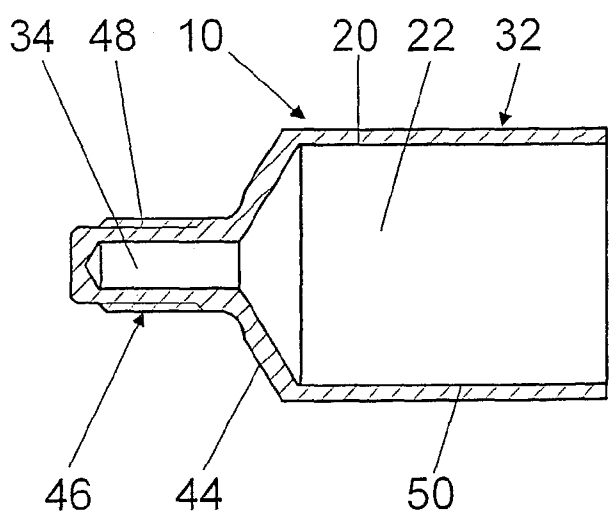
FIG. 3 shows a section along the line III—III in FIG. 2.

FIG. 1 shows a cutting head 12 of a tile cutting tool 28 comprised of a sintered component, with a work surface 30, which is provided with cutting particles 14, i.e. diamonds, in a sintering process.

The cutting head 12 has a press-fitted core 18 made of copper. An internal thread 16 is let into the core 18 and the cutting head 12 can be screwed onto an external thread 48 of a support area 46 of a base body 10 of the tile cutting tool 28 (FIGS. 1, 2, 3, and 6). If the cutting head 12 is worn-out, it can easily be unscrewed from the base body 10 and replaced.

Figure 4:
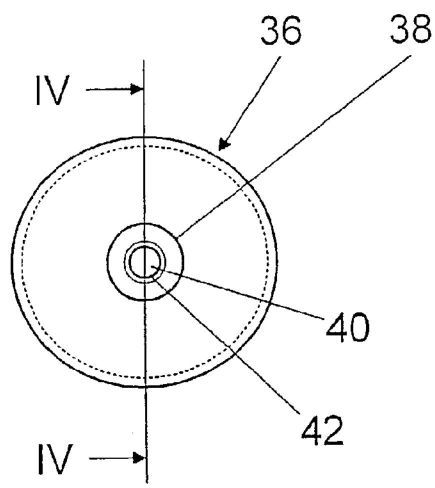
FIG. 4 shows a top view of a stopper part of the base body.
Figure 5:
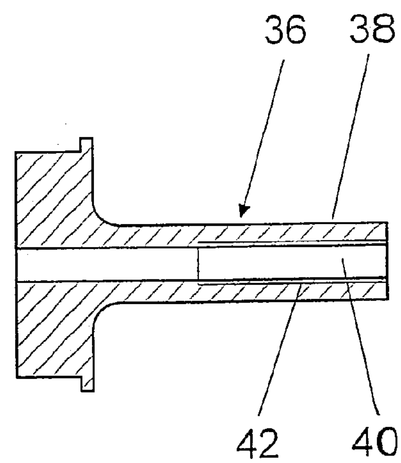
FIG. 5 shows a section along the line V—V in FIG. 4.
Figure 6:
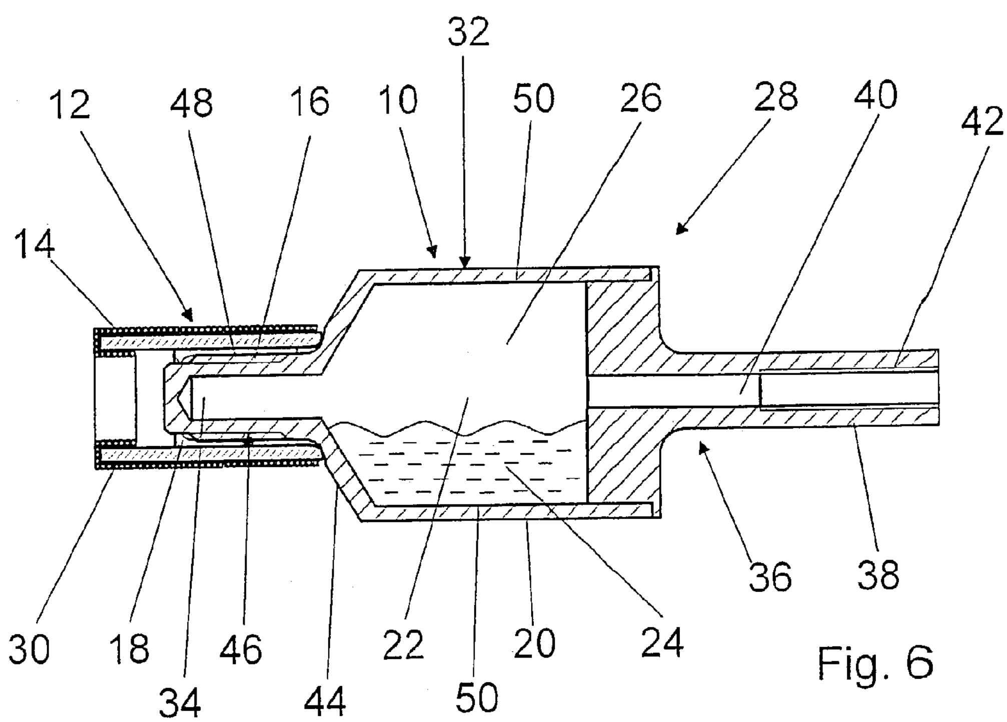
FIG. 6 shows a section through the cutting head and the base body when mounted in place.

The base body 10 is comprised of a receptacle 20 for containing a coolant 24 and has a first component 32, which constitutes a chamber 22, and a second component, which constitutes a stopper part 36 for the chamber 22 (FIGS. 2 to 5). The stopper part 36 can be press-fitted into the first component 32 and can be connected to it in a materially adhesive fashion by means of soldering (FIG. 6).

At an end oriented toward the cutting head 12, the component 32 that constitutes the chamber 22 has a tapering 44 that, toward the cutting head 12, is adjoined by the support region 46 with the external thread 48. Before the tapering 44, the component 32 has a relatively large diameter in comparison to the cutting head 12, as a result of which an advantageously large chamber volume can be provided for the coolant 24. However, there are also conceivable cutting tools whose base bodies have the same diameter as the cutting head or a smaller diameter than the cutting head.

The tapering 44 also constitutes an axial stop surface for the cutting head 12. The bolt-shaped support region 46 is embodied as hollow; a bore 34 is let into the component 32 from the end oriented away from the cutting head 12 and extends toward the cutting head 12. Heat can therefore be advantageously conveyed away from the support region 46 by means of the coolant 24.

A shaft 38 with a concentric bore 40 is formed onto the stopper part 36, extending axially from the end oriented away from the cutting head 12. The shaft 38 allows the base body 10 to be clamped into a tool-holding device of a hand machine tool that is not shown in detail and to be driven to rotate. At the end oriented away from the cutting head 12, the bore 40 has an internal thread 42 let into it, into which a screw, not shown, with a sealing disk can be screwed and the chamber 22 can be sealed in a gas-tight manner (FIGS. 4 and 5).

The coolant 24 is water and part of the chamber 22 is filled with air 26. During a working process, an operative centrifugal force pushes the liquid coolant 24 radially outward against a wall 50 of the chamber 22. Due to the action of the force, the coolant 24 is distributed over the length of the chamber 22 and thus travels into the bore 34 of the support region 46 of the tile cutting tool 28.

If the coolant 24 reaches its boiling temperature in the front support region 46 of the chamber 22 due to a frictional action of the cutting head 12 in which the machining direction extends essentially lateral to the longitudinal direction of the tile cutting tool, then the coolant 24 partially evaporates. The evaporated coolant 24 expands throughout the chamber 22 and conveys heat away from the work region 30. The quantitative proportion of air 26 to coolant 24 is balanced so that at least a part of the coolant 24 is always liquid during a working process.

REFERENCE NUMERALS

10 base body
12 cutting head
14 cutting particles
16 internal thread
18 core
20 receptacle
22 chamber
24 coolant
26 air
28 tile cutting tool
30 work surface
32 component
34 bore
36 stopper part
38 shaft
40 bore
42 internal thread
44 tapering
46 support region
48 external thread
50 wall

What is claimed is:

1. A tile cutting tool, with a base body (10), which can be clamped into a tool-holding device of a machine tool and driven to rotate, arid with a cutting head (12) that is set with cutting particles (14), at least the cutting head (12) and the base body (10) are comprised of separate components and that the component, which constitutes the cutting head (12), is designed to be replaceably fastened to the base body (10) by means of a detachable connection and the base body (10) has a receptacle (20) for containing coolant (24), the receptacle (20) has a chamber (22) that is sealed in a gas-tight manner in relation to the outside, wherein during a working process, the physical state of the coolant (24) is at least partially changeable by a thermal energy that is generated, and the coolant is comprised of a liquid that is at least partially evaporatable during a working process.

2. The tile cutting tool according to claim 1, characterized in that the detachable connection is constituted by a threaded connection.

3. The tile cutting tool according to claim 2, charactenred in that the cutting head (12) has an internal thread (16).

4. The tile cutting tool according to claim 1, characterized in that at least a pad of the coolant (24) is always in the liquid state during a working process.

5. The tile cutting tool according to claim 4 characterized in that the coolant (24) is comprised of water and part of the chamber (22) is filled with air (26).

6. The tile cutting tool according to claim 1, characterized in that the cutting tool has a rotation-symmetrical shape.

7. The tile cutting tool according to claim 1, characterized in that the base body (10) in an axial direction before a work region has a smaller cross-sectional surface area than in the work region.

8. The tile cutting tool according to claim 1, wherein the base body (10) at an end oriented toward the cutting head (12) has a tapering (44) that, toward the cutting head (12), is adjoined by a support region (46) with an external thread (48).

* * * * *